United States Patent [19]

Ida

[11] Patent Number: 4,630,149
[45] Date of Patent: Dec. 16, 1986

[54] COMPACT CASSETTE TAPE PLAYER WITH CAPSTAN DRIVE MOTOR UNDER SPINDLE

[75] Inventor: Mitsuru Ida, Koshigaya, Japan

[73] Assignee: Sony Corporation, Tokyo, Japan

[21] Appl. No.: 578,011

[22] Filed: Feb. 8, 1984

[30] Foreign Application Priority Data

Feb. 10, 1983 [JP] Japan .................................. 57-21204

[51] Int. Cl.⁴ ...................... G11B 15/00; G11B 15/26; G11B 15/32
[52] U.S. Cl. .................................. 360/96.4; 360/96.3; 242/201; 242/206
[58] Field of Search .................. 360/90, 93, 96.1–96.4; 242/68.1, 200–202, 206–209; 310/78, 156, 268

[56] References Cited

U.S. PATENT DOCUMENTS

| | | | |
|---|---|---|---|
| 4,149,202 | 4/1979 | Terada et al. | 360/96.3 |
| 4,196,875 | 4/1980 | Tatekawa et al. | 242/209 |
| 4,292,557 | 9/1981 | Kishi | 310/78 |
| 4,303,210 | 12/1981 | Fujita et al. | 242/200 |
| 4,358,804 | 11/1982 | Uehara | 360/96.4 X |

FOREIGN PATENT DOCUMENTS 58-108050 6/1983 Japan .................................. 242/201
0781940 11/1980 U.S.S.R. .............................. 242/201

Primary Examiner—Stuart W. Hecker
Assistant Examiner—Benjamin E. Urcia
Attorney, Agent, or Firm—Lewis H. Eslinger; Alvin Sinderbrand

[57] ABSTRACT

A compact cassette tape player has a motor drive system which enables a high-fidelity tape player to be made only slightly larger than the cassette being played. The tape player includes a motor which has a flat stator mounted to the player chassis, a motor shaft and a flat motor which is mounted to the motor shaft for rotation relative to the stator. The recorder includes reel pawl hubs or spindles for engaging the tape reels in the cassette. The motor shaft extends into one of the pawl hubs and is mounted in bearings at the ends of the shaft. One of the bearings is located inside the pawl hub so that the bearing mountings for the motor shaft can be spaced as far apart as possible, thus reducing the amount of wow and flutter even though the player is extremely compact. The pawl hub mounting the motor shaft is driven independently of the motor by a drive gear which engages the periphery of a gear wheel secured to the pawl hub. The drive gear is driven by a drive belt which extends from the motor rotor to the player capstan.

4 Claims, 10 Drawing Figures

| FIG. 4A |
| FIG. 4B |

COMPACT CASSETTE TAPE PLAYER WITH CAPSTAN DRIVE MOTOR UNDER SPINDLE

BACKGROUND OF THE INVENTION

1. Field of the Invention

The present invention relates to a tape reproducing apparatus and, more particularly, to a tape reproducing apparatus capable of being incorporated in a compact cassette-type tape player.

2. Description of the Prior Art

Generally, there are two types of drive systems for tape players. One of them uses the drive motor shaft as the capstan of the tape player. In theory, such a "direct drive" system is simple. However, the capstan must be rotated at a low speed, with a minimum of vibration, at a very uniform rate and without induction noise from the motor. In practice those requirements make known direct drive systems expensive and thus unsuitable for massmarketed tape players.

The other type of drive system uses a belt to transmit the rotation of the motor to a flywheel, the shaft of which comprises the capstan. The advantage of a "belt drive" system lies in its use of a flywheel for masking vibration and irregular rotation of the motor. In addition, the motor does not have to be near the capstan as it does in a direct drive system. As a result, belt drive systems are preferred in mass-marketed tape players, both cassette and open-reel as well as in many professional-class open-reel tape players.

Manufacturers are constantly attempting to reduce the size of portable cassette-type tape players. A particularly difficult problem to overcome has proved to be reducing the thickness of such a tape player. One proposal for reducing the thickness of a cassette-type tape player involves the use of a reduced-diameter cylindrical drive motor and orienting it so that the shaft lies parallel to the cassette. Thus, the motor shaft is perpendicular to the capstan and the drive belt must be twisted from one plane into another. In addition, the reduction of the diameter of the motor reduces the power capacity of the motor which places a limit on how small the motor can be made.

Another proposal for making a thin cassette-type tape player involves the use of a flat motor. The rotor and stator of a flat motor are substantially planar and parallel to each other, with the motor shaft normal to the motor plane. Using a flat, thin motor would, of course, enable the tape player to be made thinner. However, practically speaking, the motor shaft must be mounted in bearings. To reduce vibration and increase performance, there should be two bearings located as far apart from each other as possible. Therefore, the tape player must be thick enough to enable the bearings to be spaced apart a sufficient distance to provide the necessary rotational stability to the motor shaft. The only alternative to widely spacing the bearings is the use of additional restrictions on the rotating shaft along its length. However, such restrictions introduce frictional losses and thus require a more powerful motor, which is a disadvantage in a portable tape player.

SUMMARY OF THE INVENTION

It is an object of the present invention to overcome those shortcomings of prior art tape reproducing apparatus.

It is another object of the present invention to provide a cassette-type tape player which can be made compact.

In accordance with an aspect of the present invention a tape reproducing apparatus comprises, a motor having a stator mounted on the apparatus, a motor shaft and a rotor mounted to the motor shaft for rotation relative to the stator, spindle means mounted to the apparatus for rotation by the motor to drive a tape reel when the tape reel is mounted on the apparatus and bearing means disposed at least partially internally of the spindle means for rotatably mounting the motor shaft to the apparatus, wherein the spindle means is rotatable relative to the rotor.

Those and other objects, features and advantages of the present invention will become apparent when the following detailed description of the preferred embodiments of the invention are considered along with the drawings.

BREIF DESCRIPTION OF THE DRAWINGS

DETAILED DESCRIPTION OF THE PREFERRED EMBODIMENT

Figure 1:
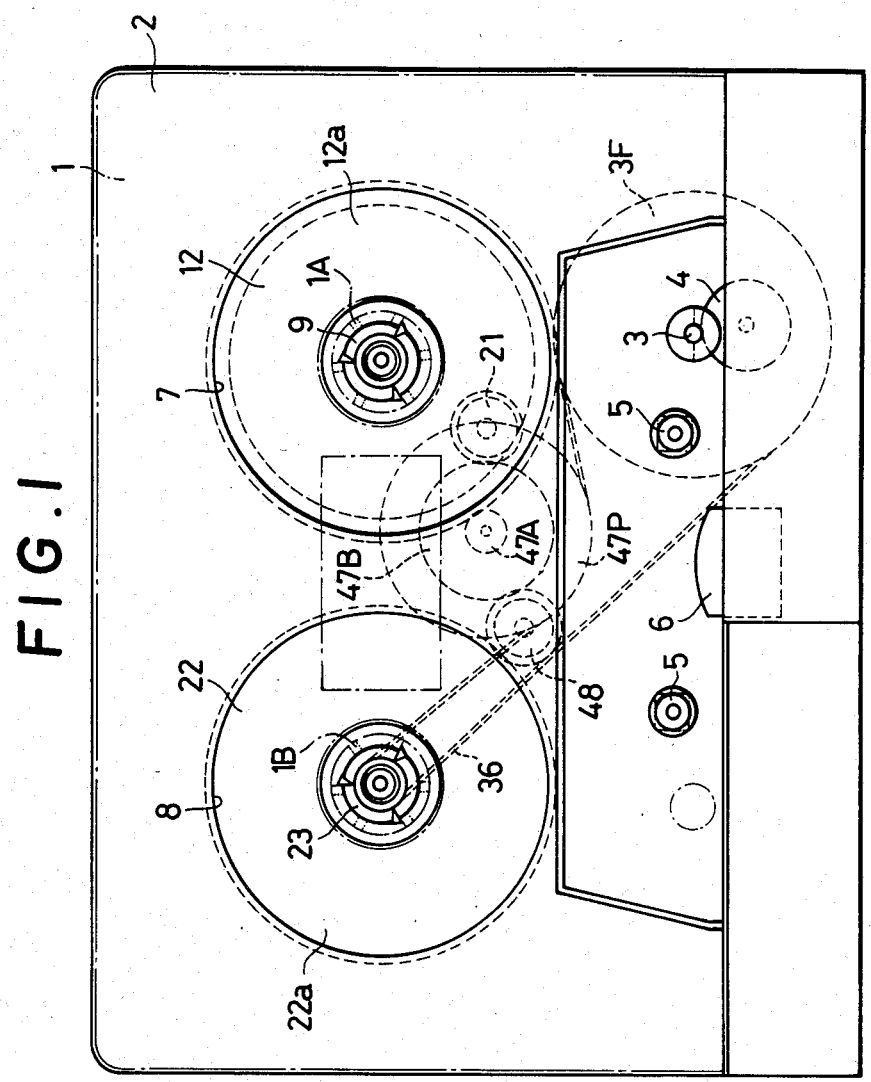
FIG. 1 is a top view of a cassette-type tape player incorporating the present invention.

FIG. 1 shows a tape cassette 1 having a pair of reel hubs 1A and 1B mounted in a cassette-type tape player with a chassis 2. The tape player includes a capstan 3, a pinch roller 4 opposite the capstan 3, guide pins 5 for the tape being played and a play head 6, arranged on the chassis 2. A pair of circular openings 7 and 8 are formed in the chassis 2.

Figure 2:
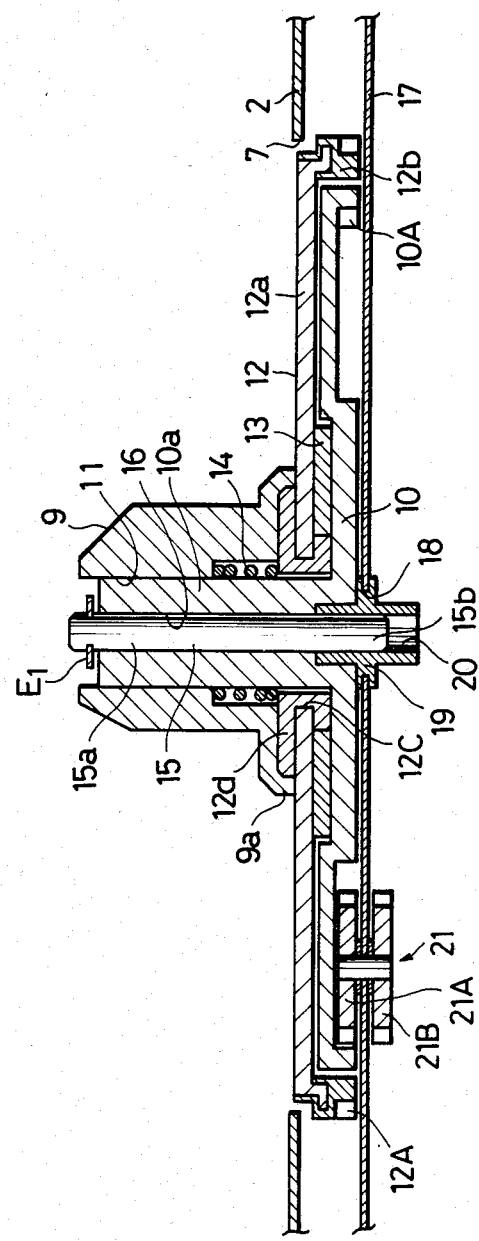
FIG. 2 is a sectional view of the take-up reel of the cassette-type tape player shown in FIG. 1.

A take-up reel pawl or spindle means includes a take-up reel pawl hub or spindle 9 that engages the reel hub 1A of the tape cassette 1 for driving the take-up reel of the cassette when the pawl hub 9 rotates. As shown in FIG. 2, a fast-forward gear 10 includes a tubular projection 10a that is press-fitted into a vertical through-hole 11 in the take-up reel pawl hub 9. (It will be understood that directional terms such as "vertical", "lower", "downwardly", etc., are used here to facilitate the description of the invention and do not limit the invention to apparatus so oriented.) Rotation of the fast-forward reel gear 10 thus rotates the pawl hub 9. Gear teeth 10A are formed on the inside of a flange at the periphery of the fast-forward reel gear 10.

The take-up reel pawl means also includes a play reel gear 12 that consists of a circular metal plate 12a and a gear-tooth ring member 12b. The metal plate 12a has a central hole 12c therein in which is disposed a central body 12d. The gear-tooth ring member 12b is formed integrally on the periphery of the plate 12a by injection molding a synthetic resin in place on the plate 12a. External gear teeth 12A are formed in the ring member 12b. The central body 12d is formed integrally on the central hole 12c of the plate 12a by injection molding a synthetic resin in place in the hole 12c. The relative sizes of the tubular projection 10a and the central opening in the central body 12d are such that the fast-forward reel gear 10 and the play reel gear 12 are rotatable freely relative to each other. The take-up reel pawl hub 9 includes a depending flange 9a, which cooperates with the outer edge of the central body 12d to form a bearing between the fast-forward reel gear 10 and the play reel gear 12. A friction plate 13 made of felt is adhered to the lower surface of the play reel gear 12 to provide a frictional drive between the fast-forward reel gear 10 and the play reel gear 12. Thus, rotation of the play reel gear 12 will rotate the take-up reel pawl hub 9. The play reel gear 12 is biased toward the fast-forward reel gear 10 by a coil spring 14 which fits between the outside of the tubular projection 10a and inside of the take-up reel pawl hub 9.

The fast-forward reel gear 10, the take-up reel pawl 9 and the play reel gear 12 are rotatably supported by a take-up reel shaft 15. The shaft 15 has an upper portion 15a, which passes through a central hole 16 in the tubular projection 10a, and a lower portion 15b. The lower portion of the shaft 15b is supports the take-up reel pawl means on a chassis plate 17 having a mounting hole 18. The mounting hole 18 has a sleeve 19 secured to it and the lower portion 15b of the shaft 15 is press-fitted into a central passage 20 in the sleeve 19. The chassis plate 17 is secured to the chassis 2. Twin fast-forward drive gears 21, to be described later, are rotatably mounted to the chassis plate 17 and mesh with the fast-forward reel gear teeth 10A. An "E" ring E1 fits in a circumferential groove in the shaft 15 to prevent removal of the take-up reel pawl means from the tape player.

Figure 3:
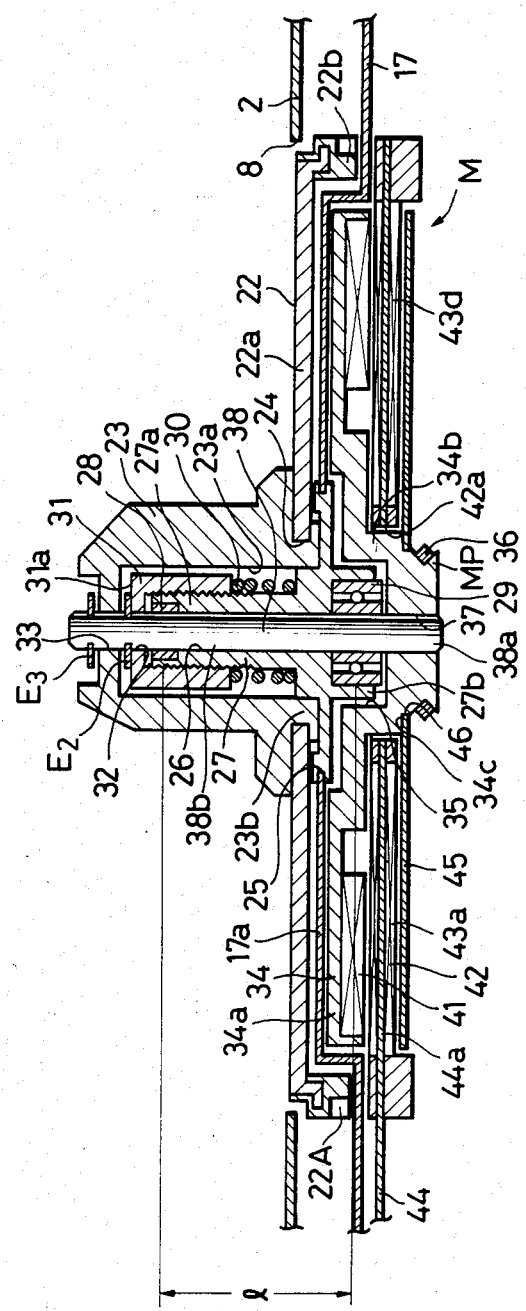
FIG. 3 is a sectional view of the supply reel of the cassette-type tape player shown in FIG. 1.

FIG. 3 shows a supply reel pawl or spindle means that includes a rewind reel gear 22 arranged at the center of the other opening 8 in the chassis 2. The rewind reel gear 22 comprises a metal plate 22a and a gear-tooth ring member 22b. The gear-tooth ring member 22b is formed at the periphery of the metal plate 22a by injection molding a synthetic resin and has at its outer periphery gear teeth 22A. The supply reel pawl means includes a supply reel pawl hub or spindle 23 having a hollow interior 23a and a bearing portion 23b. The supply reel pawl hub 23 is formed integrally in a central opening 24 of the metal plate 22a by injection molding a synthetic resin in place on the metal plate 22a. The supply reel pawl hub 23 engages the supply reel hub 1B of the tape cassette 1 for driving the tape cassette supply reel when the supply reel pawl 23 rotates.

A drive motor M is attached to the chassis plate 17 under the rewind reel gear 22, as shown in FIG. 3. The motor M is a flat, substantially planar brushless motor, the main body of which comprises a rotor portion and a stator portion, both of which are very thin.

Figures 4, 4A:
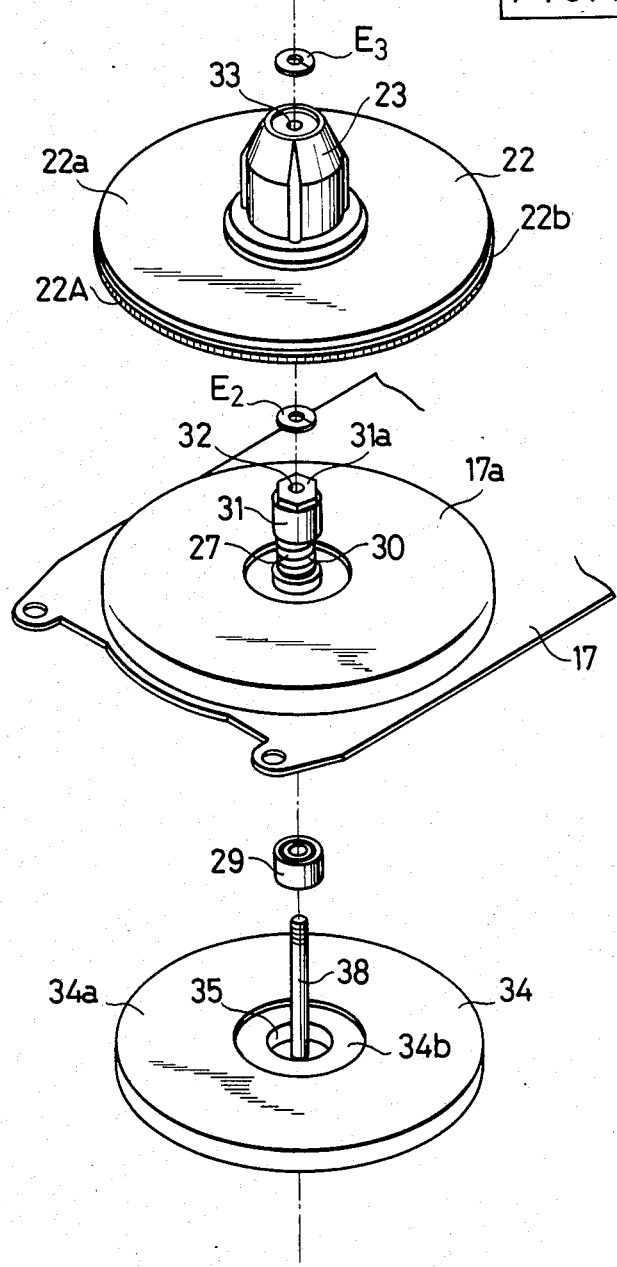
FIGS. 4A and 4B are exploded perspective views of the motor and supply reel shown in FIGS. 1 and 3.
Figure 4B:
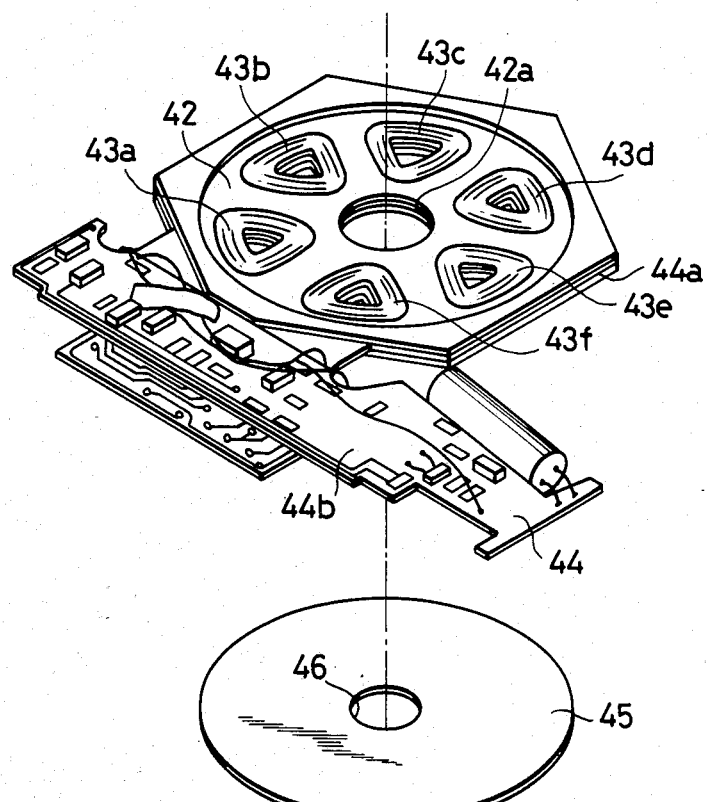

The drive motor M and its mounting in accordance with the present invention are shown in detail in FIGS. 3, 4A and 4B. A circular platform portion 17a of the chassis plate 17 nests inside the rewind reel gear 22. The chassis plate 17 has a central opening 25. A through hole 26 is formed axially of a cylindrical bearing sleeve 27 secured to the chassis plate 17 in the opening 25. An upper end portion or extension 27a of the bearing sleeve 27 is disposed within the hollow interior 23a of the supply reel pawl hub 23. A cylindrical, oil-impregnated sintered bearing 28 fits within the upper end of the bearing sleeve 27. A cylindrical ball bearing 29 is press-fitted into the through hole 26 at the lower end portion or extension 27b of the bearing sleeve 27 which extends externally of the supply reel pawl hub 23.

Threads are formed externally on the upper end portion 27a of the bearing sleeve 27. A coil spring 30 is disposed between a cylindrical thrust member 31 and the bearing sleeve 27. Internal threads are formed in the cylindrical thrust member 31 and the thrust member 31 is screwed onto the upper end portion 27a of the sleeve against the biasing force of the coil spring 30. The spring 30 prevents the thrust member 31 from inadvertantly moving during use of the tape player. A central hole 32 is formed in the top of the thrust member 31 and a hole 33, aligned with the hole 32, is formed in the supply reel pawl 23.

The rotor 34 of the motor M is made of a magnetic material such as BMC (bulkmold compound). The rotor 34 includes a flat portion 34a which nests inside the platform portion 17a of the chassis plate 17, and a downwardly projecting central portion 34b. The central portion 34b includes a shoulder 34c. The lower end portion 27b of the bearing sleeve 27 fits within a recess 35 formed by the central portion 34b. A motor pulley MP carrying a drive belt 36 is formed integrally in the lower end of the portion 34b of the rotor 34.

A hole 37 is formed centrally in the central portion 34b of the rotor 34. A motor shaft 38 has its lower portion 38a press-fitted into the hole 37. The shaft 38 extends vertically from the rotor 34 and the upper portion 38b of the shaft goes through the ball bearing 29, the through hole 26 of the bearing sleeve 27, the sintered bearing 28, and the holes 32 and 33. "E" rings E2 and E3 fit into respective circumferential grooves in the motor shaft 38. The lower "E" ring E2 is in contact with an upper face 31a of the thrust member 31 and as the thrust member 31 is turned it forces the rotor 34 and the rotating shaft 38 upwardly. The upper "E" ring E3 prevents removal of the supply reel pawl means.

The supply reel pawl hub 23 and the rewind reel gear 22 rotate freely on the motor shaft 38. The inner surface of the supply reel pawl hub 23 at the bearing portion 23b thereof slides on an outer circumferential surface of the bearing sleeve 27. Thus, in the present invention, the supply reel pawl means rotates independently of the rotor 34 of the motor M.

A ring-like flat rotor magnet 41, alternately magnetized to North and South poles along its circumference, is fixed to the lower surface of the flat portion 34a of the rotor 34. A stator coil assembly 42 having an annular flat configuration is fixed to the chassis plate 17 by screws (not shown) or other suitable fastening means to face the rotor magnet 41. A central opening 42a in the stator coil assembly 42 loosely receives the central portion 34b of the rotor 34. As shown in FIG. 4B, the stator coil assembly 42 includes six coil units 43a to 43f, each of which comprises a pair of coils, mounted on a lead mounting portion 44a of a printed circuit board 44. The circuit board 44 includes a drive circuit 44b adjacent to the lead mounting portion 44a. The six coil pairs 43a to 43f are located in an annular pattern around the ring-shaped lead mounting portion 44a so that each pair of coils sandwiches the lead mounting portion 44a therebetween. The lead mounting portion 44a and the coil units 43a to 43f are made into an integral unit using synthetic resin.

A circular hysteresis plate 45 is attached to the rotor 34 opposite the lower surface of the stator coil assembly 42. The hysteresis plate 45 is centered by the central portion 34b of the rotor 34 in a central hole 46 of the plate 45. The hysteresis plate 45 is attracted upward by the magnetic attraction of the magnet 41. The hysteresis plate 45 is supported by the shoulder 34c on the central portion 34b.

In accordance with the present invention, the bearing sleeve 27 has the oilless bearing 28 and the ball bearing 29 disposed therein at a significant distance "1" from each other, as shown in FIG. 3. Thus, power consumption and distortion from wow and flutter are minimized even though a flat brushless motor is used because the distance between the two bearings 28, 29 can be made long enough to overcome those problems. In accordance with the present invention, the motor M is arranged coaxially with a pawl means of the recorder which is rotatable independently of the motor. A separate drive means, described in detail below, is used to drive the supply and take-up pawl hubs. The thickness of the motor M in the axial direction of the shaft 38 is therefore greatly reduced, and the size of the tape player can be made very compact.

Figure 5:
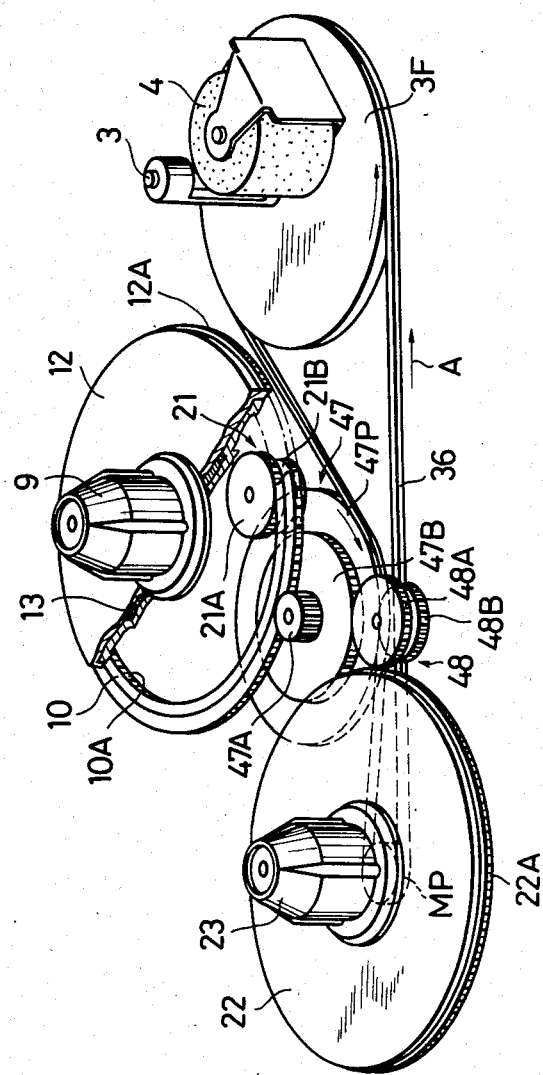
FIG. 5 is a perspective of the tape reels and drive means of the cassette-type tape player shown in FIG. 1.

FIG. 5 shows the drive system for the tape player. The belt 36 travels around the motor pulley MP on the rotor 34 of the motor M and around the periphery of a capstan flywheel 3F. The motor M drives the belt 36 in the direction indicated by the arrow A. The belt 36 also drives a master gear-pulley 47 that is movable between three positions, as described below, for providing PLAY, FAST-FORWARD and REWIND modes of operation, respectively. The master gear-pulley 47 includes an idler pulley 47P which remains in contact with the belt 36 and a first master drive gear 47A and a second master drive gear 47B. The motor M drives the capstan 3 and the master gear-pulley 47 in the directions indicated by the arrows in FIG. 5. The first master drive gear 47A meshes with the gear teeth 12A on the reel gear 12 when the player is operated in the PLAY mode.

The twin fast-forward drive gears 21 are rotatably mounted on the chassis plate 17 near the idler pulley 47P and the fast-forward reel gear 10 (see FIG. 2). The twin fast-forward drive gears 21 comprise a first FF drive gear 21A above the chassis 2 and a second FF drive gear 21B below the chassis plate 17. The first FF drive gear 21A meshes with the gear teeth 10A of the fast-forward reel gear 10, and the second FF drive gear 21B meshes with the second master drive gear 47B of the master gear-pulley 47 when the player operated is in the FAST-FORWARD mode.

Twin rewind drive gears 48 are rotatably mounted on the chassis plate 17 near the master gear-pulley 47 and at the side of the rewind reel gear 22. A first rewind drive gear 48A above the chassis plate 17 meshes with the gear teeth 22A on the rewind reel gear 22. A second rewind drive gear 48B below the chassis plates 17 meshes with the second master drive gear 47B of the master gear-pulley 47 when the player operated is in the REWIND mode.

Figure 6A:
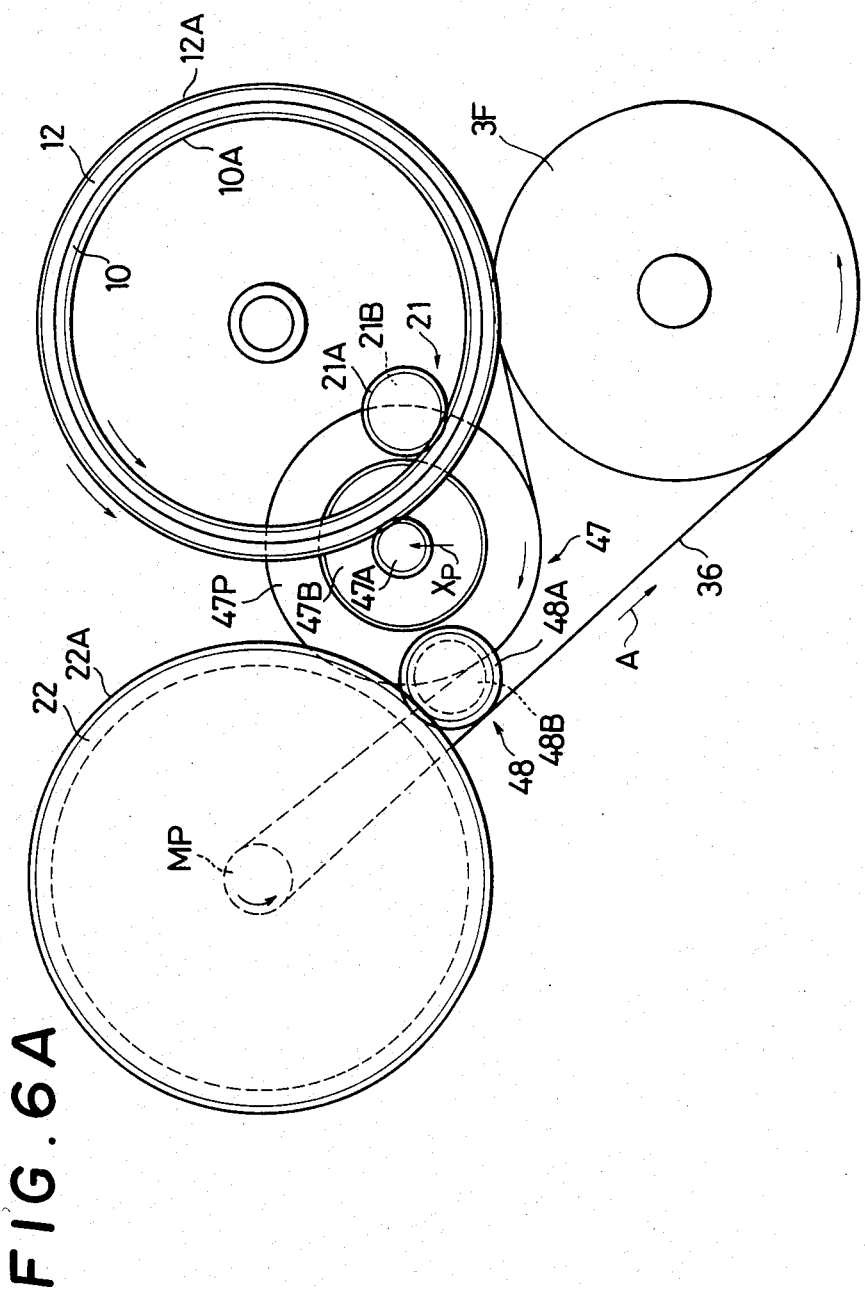
FIGS. 6A–6C show the positions of the drive means in FIG. 5 in the PLAY, FAST-FORWARD and REWIND modes, respectively, of the drive means shown in FIG. 5.
Figure 6B:
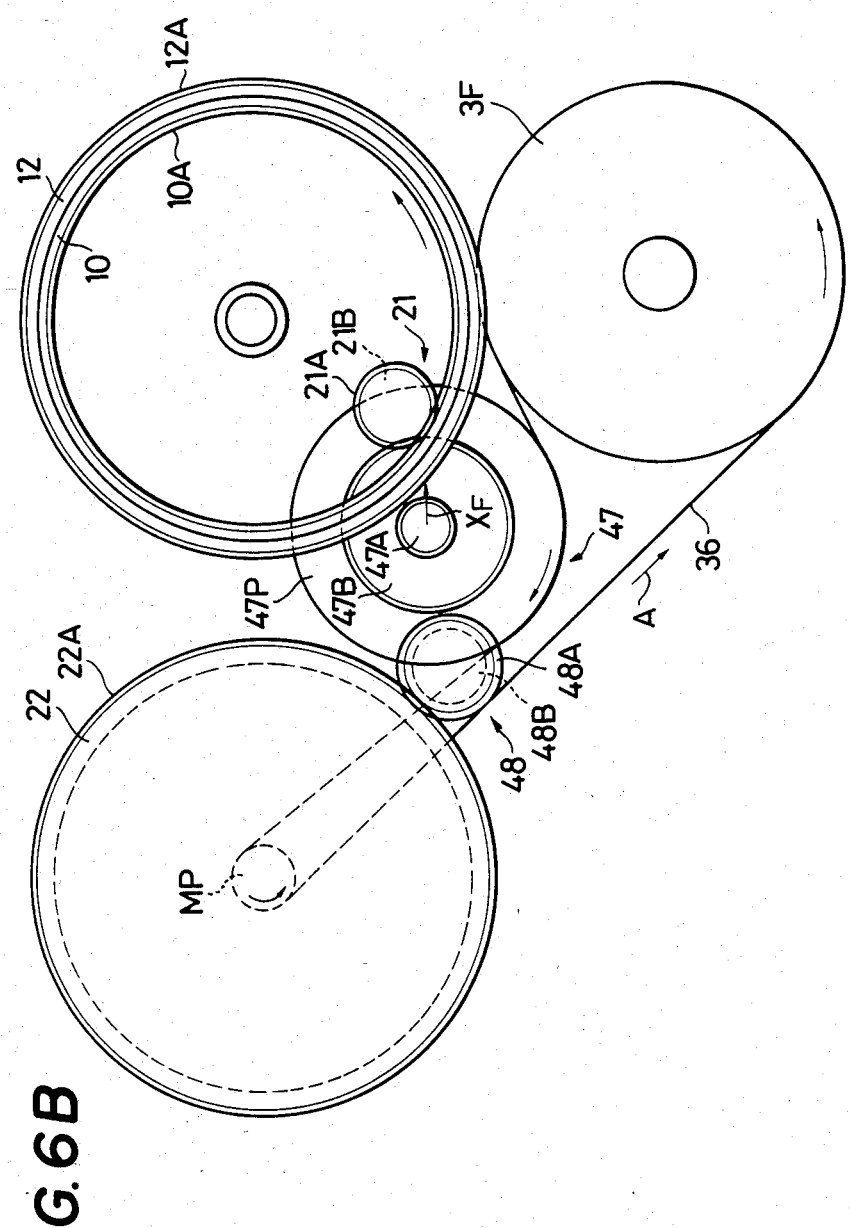
Figure 6C:
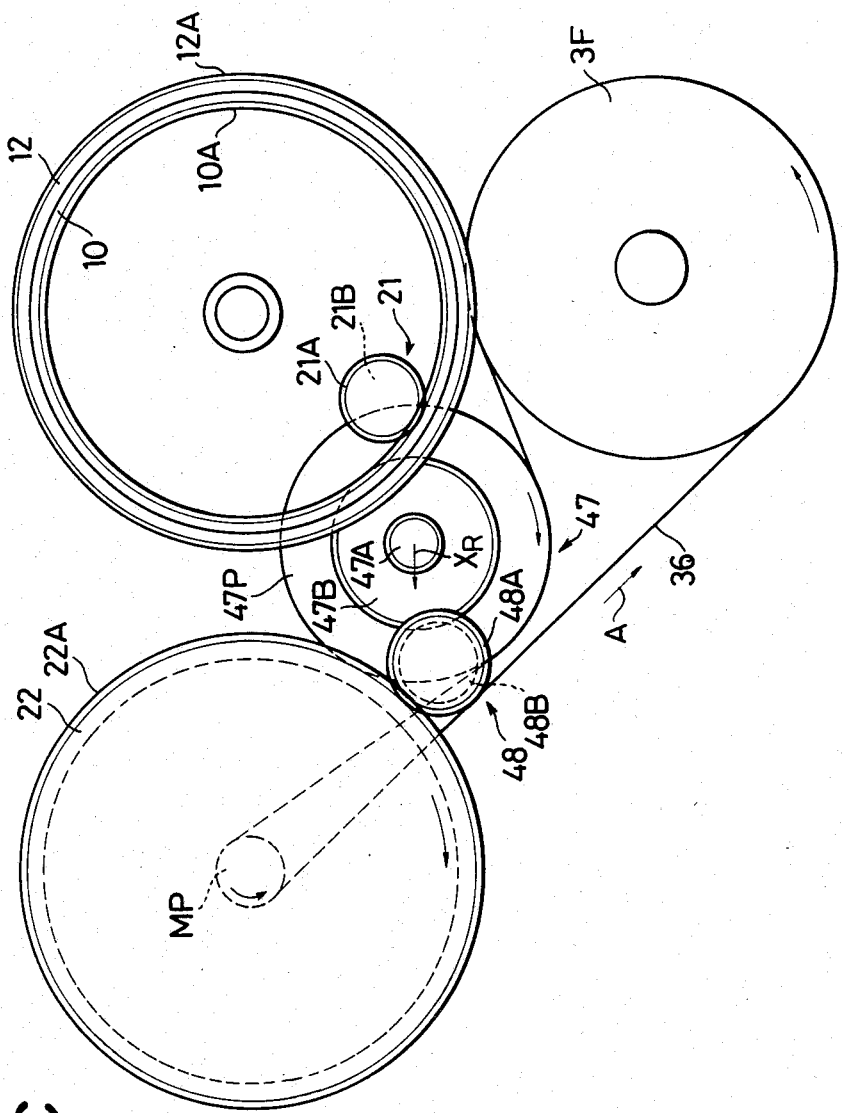

The operation of the drive system is shown in FIGS. 6A–6C.

FIG. 6A depicts the PLAY mode of the player. When a PLAY button (not shown) is depressed, the master gear-pulley 47 moves in the direction indicated by the arrow $X_P$, so the first master drive gear 47A meshes with the gear teeth 12A on the play reel gear 12. The play reel gear 12 rotates counter-clockwise, and, through the friction plate 13, causes the take-up reel pawl hub 9 to rotate. (See FIG. 2.) The PLAY button also actuates a mechanism (not shown) that moves the pinch roller 4 toward the rotating capstan 3 to advance the tape past the head 6.

FIG. 6B depicts the FAST-FORWARD mode of operation of the player. When a FAST-FORWARD button (not shown) is depressed, the master gear-pulley 47 swings in the direction indicated by the arrow $X_F$, so the second master drive gear 47B meshes with the second FF drive gear 21B of the twin fast-forward drive gears 21. The twin fast-forward drive gears 21 thus rotate counterclockwise to propel the fast-forward reel gear 10 counterclockwise and advance the tape at a rapid rate. The pinch roller 4 is not pressed against the capstan 3 in the FAST-FORWARD mode.

FIG. 6C depicts the REWIND mode of operation of the player. When a REWIND button (not shown) is depressed, the master gear-pulley 47 swings in the direction indicated by the arrow $X_R$, so that the second master drive gear 47B meshes with the second rewind drive gear 48B of the twin rewind drive gears 48. The twin rewind drive gears 48 rotate counterclockwise and rotate the rewind reel gear 22 clockwise to rewind the tape from the take-up reel to the supply reel.

Thus, with the present invention a cassette tape player can be made with dimensions that only slightly exceed the dimensions of the cassette being played, as shown in FIGS. 1–3, while providing high fidelity reproduction and power consumption low enough to make battery operation possible. And, as FIGS. 2–4 show, the various parts of the player can be "nested" to reduce even further the thickness of the player. The high fidelity and low power consumption of the tape reproducing apparatus of the present invention in spite of its small size is the result of using the vertical space available in one of the pawl hubs to increase the length between the motor shaft bearings, while permitting the pawl hub to rotate relative to the motor rotor. The pawl hub is then driven independently of the rotation of the motor shaft.

Figure 7:
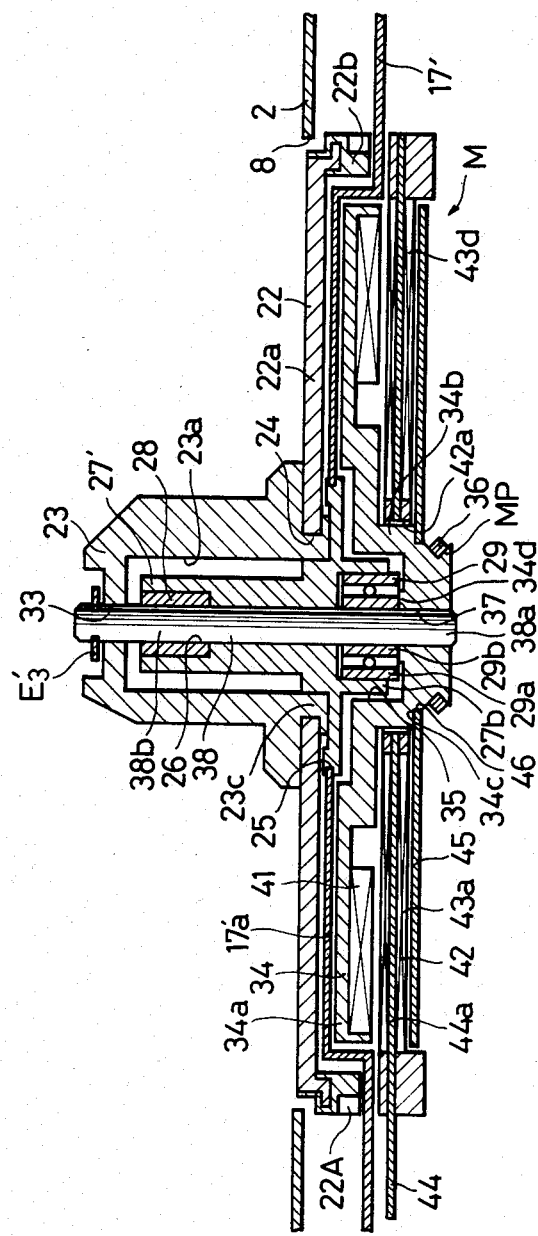
FIG. 7 is a sectional view of a supply reel and motor in accordance with an alternate embodiment of the cassette-type tape player shown in FIG. 1.

FIG. 7 shows a modification of the above-described embodiment of the present invention. The modified embodiment is similar to the supply reel pawl means shown in FIG. 3 except that the coil spring 30, the thrust member 31, and the "E" ring E2 are omitted. A chassis plate 17' is made of magnetic material. Thus, the rotor 34 and the shaft 38 are urged upwardly by the magnetic attraction between the chassis plate 17' and the rotor magnet 41. The rotor 34 presses against the ball bearing 29, the outer race 29a of which is press-fitted in a bearing sleeve 27', so that a pre-load is applied to the ball bearing 29. In this embodiment the inner race 29b of the ball bearing 29 loosely fits on the rotating shaft 38. For this reason, when the shaft 38 is attracted upwardly by the magentic force as described above, an annular rib 34d on the rotor 34 urges the inner race 29b upwardly. However, upward movement of the inner race 29b is restricted by the balls between the races 29a and 29b, and thus the ball bearing 29 determines positions of the bearing sleeve 27' and the shaft 38. In this embodiment an "E" ring E' prevents removal of the shaft 38 from the bearing sleeve 27'. According to the modification shown in FIG. 7, the thrust member 31 in the previous embodiment may be omitted, and the thickness of the motor along the axial direction of the shaft 38 can be reduced even further.

Although specific embodiments of the invention have been described in detail with reference to the accompanying drawings, it is to be understood that the invention is not limited to those embodiments, and that various changes and modifications other than those specifically pointed out can be made by those skilled in the art without departing from the scope or spirit of the invention as defined in the following claims.

What is claimed is:

1. In an apparatus for reproducing signals recorded on a tape as the latter is moved at a constant speed from one another of two reels on which the tape is wound, said apparatus including two rotary spindle means arranged with their axes parallel and spaced from each other and adapted to have said two reels respectively mounted thereon, a rotatable capstan disposed to be engageable with the tape between said reels and being fixed to a flywheel, and a pinch roller for pressing the tape against said capstan which thereby drives the tape during a reproducing operation of the apparatus; a drive device comprising:

a motor including a shaft, a rotor secured to an end portion of said shaft and extending radially outward therefrom, a stator disposed in confronting relation to said rotor and being spaced from the latter in the direction of the axis of said shaft, said rotor being rotated at a constant rotational speed relative to said stator during said reproducing operation, and motor pulley means fixed relative to said shaft;

bearing means disposed, at least in part, within one of said spindle means, a portion of said shaft remote from said end portion having the rotor secured thereon extending axially into said one spindle means and being rotatably supported by said bearing means in the latter with said rotor and stator being axially remote from the reel mounted on said one spindle means;

an endless belt extending around said motor pulley means and said flywheel for driving said capstan at a constant rotational speed in response to the rotation of said rotor; and transmission means driven by said belt and including frictional coupling means through which the other of said spindle means is rotated from said motor shaft for take-up of the tape on the reel mounted on said other spindle means during said reproducing operation.

2. An apparatus according to claim 1; further comprising a chassis having said spindle means disposed at one side thereof; and in which said bearing means includes a bearing sleeve secured to said chassis and extending from said one side of the chassis into said one spindle means, and said stator and rotor are disposed substantially parallel to said chassis at the other side of the latter.

3. An apparatus according to claim 1; in which said transmission means includes two axially confronting circular plates rotatable in respect to each other about the axis of said other spindle means with one of said circular plates being fixed to said other spindle means, and idler gear means driven by said belt and rotatably driving the other of said circular plates during said reproducing operation, and said frictional coupling means is interposed axially between said two confronting circular plates for driving said one plate from said other plate while permitting relative slippage therebetween during said reproducing operation.

4. An apparatus according to claim 3; in which said one spindle means has a circular base plate fixed thereto, and said idler gear means is selectively shiftable from a first condition for said driving of the other of said circular plates rotatable about said axis of the other spindle means during said reproducing operation to a second condition in which said idler gear means directly drives said one circular plate fixed to said other spindle means for a fast-forward operation, and to a third condition in which said idler gear means directly drives said circular base plate fixed to said spindle means for a rewind operation.

* * * * *